US008821336B2

(12) United States Patent
Wilton et al.

(10) Patent No.: US 8,821,336 B2
(45) Date of Patent: Sep. 2, 2014

(54) MULTI-SPEED TRANSMISSION AND BACKING PLATE

(75) Inventors: Daryl A. Wilton, Macomb, MI (US); James M. Hart, Belleville, MI (US); Edward W. Mellet, Rochester Hills, MI (US); James B. Borgerson, Clarkston, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 196 days.

(21) Appl. No.: 13/473,183

(22) Filed: May 16, 2012

(65) Prior Publication Data
US 2013/0310211 A1 Nov. 21, 2013

(51) Int. Cl.
*F16H 3/66* (2006.01)
*F16D 13/72* (2006.01)

(52) U.S. Cl.
USPC ........ 475/280; 475/288; 475/159; 192/70.12; 192/113.34

(58) Field of Classification Search
USPC .................. 475/271–291, 296, 330, 159; 192/70.12, 113.34
See application file for complete search history.

(56) References Cited

U.S. PATENT DOCUMENTS

| | | | |
|---|---|---|---|
| 4,113,067 A * | 9/1978 | Coons et al. ................. 188/71.6 |
| 5,240,095 A * | 8/1993 | Shimamura et al. ....... 192/70.12 |
| 6,991,578 B2 | 1/2006 | Ziemer |
| 7,011,597 B2 | 3/2006 | Haka |
| 7,018,319 B2 | 3/2006 | Ziemer |
| 8,409,045 B1 * | 4/2013 | Mellet et al. .................. 475/280 |
| 8,506,442 B2 * | 8/2013 | Mellet et al. .................. 475/276 |
| 2008/0142331 A1 * | 6/2008 | Miyazaki et al. .......... 192/70.12 |
| 2010/0216589 A1 * | 8/2010 | Hart et al. ..................... 475/275 |
| 2012/0298464 A1 * | 11/2012 | Cimatti ...................... 192/70.12 |
| 2013/0040776 A1 * | 2/2013 | Mellet et al. .................. 475/275 |
| 2013/0203546 A1 * | 8/2013 | Mellet et al. .................. 475/276 |
| 2013/0281246 A1 * | 10/2013 | Neelakantan et al. ........ 475/120 |

OTHER PUBLICATIONS

U.S. Appl. No. 13/206,862, filed Aug. 10, 2011, by Mellet et al. All pages.
U.S. Appl. No. 13/348,768, filed Jan. 12, 2012, by Grochowski et al. All pages.

* cited by examiner

*Primary Examiner* — Roger Pang

(57) ABSTRACT

A transmission is provided having an input member, an output member, at least three planetary gear sets, a plurality of coupling members, and a plurality of torque transmitting devices. Each of the planetary gear sets includes first, second and third members. The torque transmitting devices include clutches and brakes actuatable in combinations of two to establish at least ten forward gear ratios and one reverse gear ratio. At least one of the torque transmitting mechanisms includes a backing plate having an annular outlet for distributing cooling fluid.

11 Claims, 5 Drawing Sheets

| GEAR STATE | GEAR RATIO | RATIO STEP | TORQUE TRANSMITTING ELEMENTS ||||||
|---|---|---|---|---|---|---|---|---|
| | | | 32 | 30 | 34 | 36 | 28 | 26 |
| REV | -2.870 | | X | | | | | X |
| N | | -0.64 | | | | | | |
| 1ST | 4.455 | | X | | X | | | |
| 2ND | 2.912 | 1.53 | | X | X | | | |
| 3RD | 1.894 | 1.54 | | | X | | | X |
| 4TH | 1.446 | 1.31 | | | X | | X | |
| 5TH | 1.000 | 1.45 | | | | | X | X |
| 6TH | 0.851 | 1.18 | X | | | X | | |
| 7TH | 0.742 | 1.15 | | X | | | X | |
| 8TH | 0.609 | 1.22 | | | | X | X | |
| 9TH | 0.556 | 1.09 | | X | | X | | |
| 10TH | 0.505 | 1.10 | | | | X | | X |

X = ON - ENGAGED CARRYING TORQUE
O = ON - ENGAGED NOT CARRYING TORQUE

FIG. 3

MULTI-SPEED TRANSMISSION AND BACKING PLATE

FIELD

The invention relates generally to a clutch assembly of a multiple speed transmission, and more particularly, to a clutch assembly of a transmission that includes a backing plate having an annular passageway to distribute fluid to the clutch assembly.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

Typically, a transmission is coupled to an engine output through a torque converter. However, a torque converter adds mass, costs, and packaging space needs, and it may also compromise fuel economy. While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission. In addition, there is a desire for a transmission that operates adequately without being connected to a torque converter.

SUMMARY

A transmission is provided having an input member, an output member, at least three planetary gear sets, a plurality of coupling members and a plurality of torque transmitting devices. Each of the planetary gear sets includes first, second and third members. The torque transmitting devices are, for example, clutches and brakes. A clutch assembly is provided that includes a backing plate that provides for sufficient cooling of its clutch plates so that the clutch assembly may be used to start launch the vehicle from a stop without the use of a torque converter. In some variations, the backing plate has an annular outlet that supplies fluid to the clutch plates around a full circumference of the backing plate.

In one variation, which may be combined with or separate from the other variations described herein, a clutch assembly for use in an automatic transmission is provided. The clutch assembly includes a set of interleaved clutch plates selectively engageable to interconnect a first member with a second member. At least one first clutch plate of the set of interleaved clutch plates is attached to the first member and at least one second clutch plate of the set of interleaved clutch plates is attached to the second member. The clutch assembly also includes a backing plate disposed adjacent to the set of interleaved clutch plates. The set of interleaved clutch plates are configured to be compressed against the backing plate when the clutch assembly is engaged. The backing plate has a first piece and a second piece. The first and second pieces cooperate to form an annular passageway therebetween.

In another variation, which may be combined with or separate from the other variations described herein, a transmission is provided that includes an input member, an output member, and first, second, third and fourth planetary gear sets each having first, second and third members. The transmission also includes at least five interconnecting members and at least six torque transmitting mechanisms. A first interconnecting member continuously interconnects the first member of the first planetary gear set with the second member of the second planetary gear set. A second interconnecting member continuously interconnects the second member of the first planetary gear set with the third member of the third planetary gear set. A third interconnecting member continuously interconnects the third member of the first planetary gear set with the third member of the fourth planetary gear set. A fourth interconnecting member continuously interconnects the first member of the second planetary gear set with the second member of the fourth planetary gear set. A fifth interconnecting member continuously interconnects the third member of the second planetary gear set with the second member of the third planetary gear set. The six torque transmitting mechanisms are each selectively engageable to interconnect at least one of the first, second, and third members with at least one other of the first, second, third members and a stationary member. The six torque transmitting mechanisms are selectively engageable in combinations of at least two to establish at least ten forward speed ratios and at least one reverse speed ratio between the input member and the output member. A first of the torque transmitting mechanisms includes a backing plate having a first piece and a second piece. The first and second pieces cooperate to form an annular passageway therebetween.

In yet another variation, which may be combined with or separate from the other variations described herein, a transmission is disclosed that includes an input member, an output member, at least four planetary gear sets, at least five interconnecting members, and at least six torque transmitting mechanisms. Each of the planetary gear sets has a sun gear member, a planetary gear carrier member, and a ring gear member. A first interconnecting member continuously interconnects the first sun gear member with the fourth sun gear member. A second interconnecting member continuously interconnects the first planetary gear carrier member with the third ring gear member and the output member. A third interconnecting member continuously interconnects the first ring gear member with the second planetary gear carrier member. A fourth interconnecting member continuously interconnects the second sun gear member with the fourth planetary gear carrier member and the input member. A fifth interconnecting member continuously interconnects the second ring gear member with the third planetary gear carrier member.

The six torque transmitting mechanisms are each selectively engageable to interconnect at least one of the sun gear members, the planetary gear carrier members, and the ring gear members with at least one other of the sun gear members, the planetary gear carrier members, the ring gear members and a stationary member. The six torque transmitting mechanisms are selectively engageable in combinations of at least two to establish at least ten forward speed ratios and at least one reverse speed ratio between the input member and the output member. A first of the six torque transmitting mechanisms is selectively engageable to interconnect the third planetary gear carrier member and the second ring gear member with the stationary member. A second of the six torque transmitting mechanisms is selectively engageable to interconnect the third sun gear member with the input member, the second sun gear member and the fourth planetary gear carrier member. A third of the six torque transmitting mechanisms is selectively engageable to interconnect the second ring gear member and the third planetary gear carrier member with the input member, the second sun gear member, and the fourth planetary gear carrier member. A fourth of the six torque transmitting mechanisms is selectively engageable to interconnect the third sun gear member with the stationary member. A fifth of the six torque transmitting mechanisms is selectively engageable to interconnect the first sun gear member and the fourth sun gear member with the stationary member. A sixth of the six torque transmitting mechanisms is selectively engageable to interconnect the fourth ring gear member with the stationary member.

The first torque transmitting mechanism has a group of interleaved clutch plates that are selectively engageable to interconnect the stationary member with a sixth interconnecting member that is continuously connected for common rotation with the third planetary gear carrier member and the second ring gear member. A first set of clutch plates of the group of interleaved clutch plates is attached to the sixth interconnect member and a second set of clutch plates of the group of interleaved clutch plates is attached to the stationary member. The first torque transmitting mechanism also includes a backing plate that is disposed adjacent to the group of interleaved clutch plates. The group of interleaved clutch plates being configured to be compressed against the backing plate when the first torque transmitting mechanism is engaged. The backing plate has an annular first piece and an annular second piece. The first and second pieces cooperate to form an annular passageway therebetween and an annular outlet of the annular passageway. The backing plate is configured to supply fluid to the plurality of interleaved clutch plates through the annular outlet. The first piece has an outer side and forms inlet openings to the annular passageway through the outer side and along the circumference of the first piece.

In still another variation, which may be combined with or separate from the other variations described herein, a clutch assembly for use in an automatic transmission is provided. The clutch assembly includes a plurality or group of interleaved clutch plates and a backing plate disposed adjacent to the plurality of interleaved clutch plates. The group of interleaved clutch plates is selectively engageable to interconnect a first member with a second member. At least one first clutch plate is attached to the first member and at least one second clutch plate is attached to the second member. The interleaved clutch plates are configured to be compressed against the backing plate when the clutch assembly is engaged. The backing plate forms an annular passageway having an annular outlet and a plurality of inlet openings disposed around an outer side of the backing plate along the circumference of the backing plate. The backing plate is configured to supply fluid to the plurality of interleaved clutch plates through the annular outlet.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 3 is a truth table presenting the state of engagement of the various torque transmitting elements in each of the available forward and reverse speeds or gear ratios of the transmissions illustrated in FIGS. 1-2;

DETAILED DESCRIPTION

The following description is merely exemplary in nature and is not intended to limit the present disclosure, application, or uses.

At the outset, it should be appreciated that the embodiments of the ten speed automatic transmissions of the present invention have an arrangement of permanent mechanical connections between the elements of the four planetary gear sets. A first component or element of a first planetary gear set is permanently coupled to a second component or element of the second planetary gear set. A second component or element of the first planetary gear set is permanently coupled a third component or element of the third planetary gear set. A third component or element of the first planetary gear set is permanently coupled to a third component or element of the fourth planetary gear set. A first component or element of a second planetary gear set is permanently coupled to a second component or element of the fourth planetary gear set. A third component or element of the second planetary gear set is permanently coupled to a second component or element of the third planetary gear set.

Figure 1:
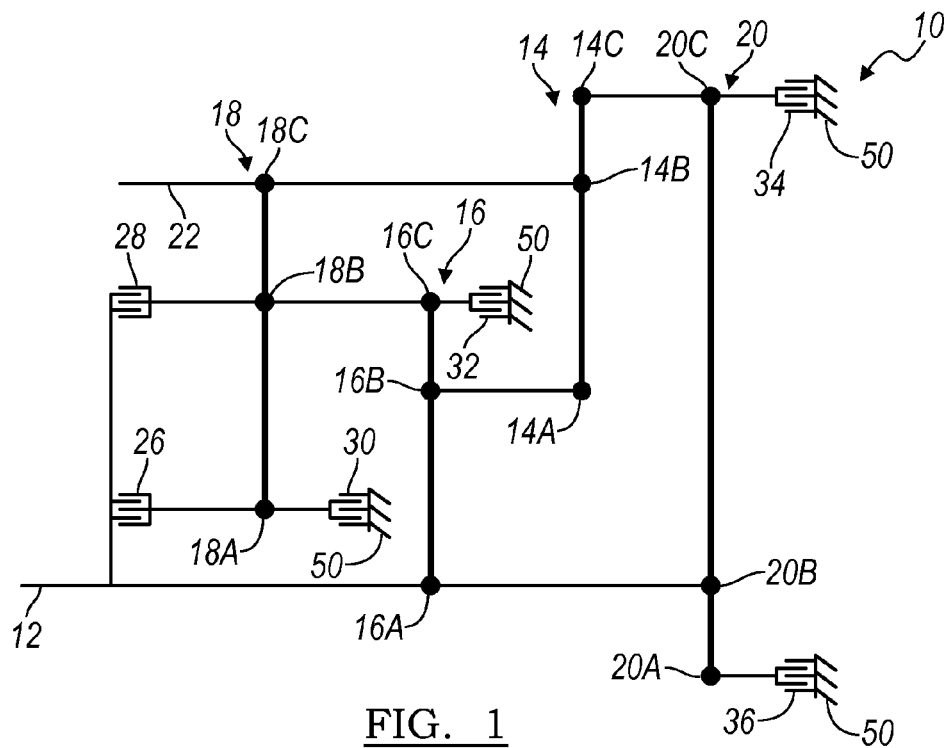
FIG. 1 is a lever diagram of an embodiment of a ten speed transmission according to the present invention.

Referring now to FIG. 1, an embodiment of a ten speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16, a third planetary gear set 18 and a fourth planetary gear set 20 and an output shaft or member 22. In the lever diagram of FIG. 1, the first planetary gear set 14 has three nodes: a first node 14A, a second node 14B and a third node 14C. The second planetary gear set 16 has three nodes: a first node 16A, a second node 16B and a third node 16C. The third planetary gear set 18 has three nodes: a first node 18A, a second node 18B and a third node 18C. The fourth planetary gear set 20 has three nodes: a first node 20A, a second node 20B and a third node 20C.

The input member 12 is continuously coupled to the first node 16A of the second planetary gear set 16 and the second node 20B of the fourth planetary gear set 20. The output member 22 is coupled to the third node 18C of the third planetary gear set 18 and the second node 14B of the first planetary gear set 14. The first node 14A of the first planetary gear set 14 is coupled to the second node 16B of the second planetary gear set 16. The second node 14B of the first planetary gear set 14 is coupled to the third node 18C of the third planetary gear set 18. The third node 14C of the first planetary gear set 14 is coupled to the third node 20C of the fourth planetary gear set 20. The third node 16C of the second planetary gear set 16 is coupled to second node 18B of the third planetary gear set 18.

A first clutch 26 selectively connects the input member or shaft 12, the first node 16A of the second planetary gear set 16 and the second node 20B of the fourth planetary gear set 20 with the first node 18A of the third planetary gear set 18. A second clutch 28 selectively connects the input member or shaft 12, the first node 16A of the second planetary gear set 16 and the second node 20B of the fourth planetary gear set 20 with the second node 18B of the third planetary gear set 18. A first brake 30 selectively connects the first node 18A of the third planetary gear set 18 with a stationary member or transmission housing 50. A second brake 32 selectively connects the third node 16C of the second planetary gear set 16 and the second node 18B of the third planetary gear set 18 with the stationary member or transmission housing 50. A third brake 34 selectively connects the third node 14C of the first planetary gear set 14 and the third node 20C of the fourth planetary gear set 20 with the stationary member or transmission housing 50. A fourth brake 36 selectively connects the first node 20A of the fourth planetary gear set 20 with the stationary member or transmission housing 50.

Figure 2:
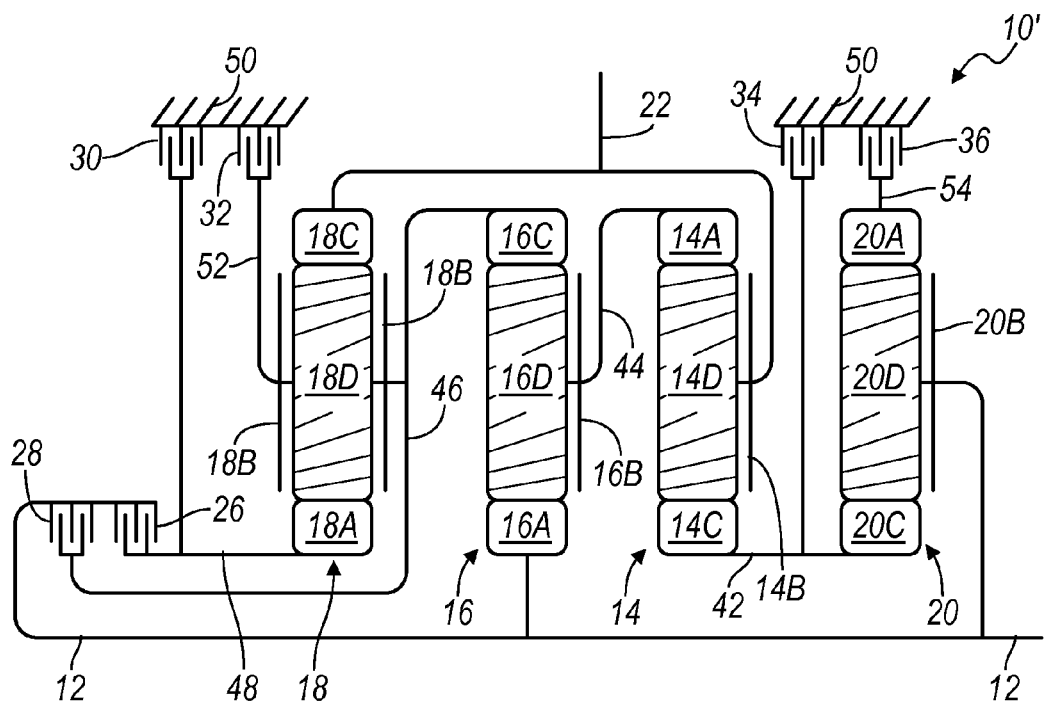
FIG. 2 is a diagrammatic illustration of an embodiment of a ten speed transmission according to the present invention.

Referring now to FIG. 2, a stick diagram presents a schematic layout of an embodiment of the ten speed transmission 10' according to the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers. In an embodiment of the present invention, the four planetary gear sets 14, 16, 18 and 20 are simple planetary gear sets, as described below. However, the present invention contemplates other embodiments that replace the simple planetary gear sets with all or a combination of compound planetary gear sets having two or more sets of planet pinions supported by a single carrier member.

For example, the planetary gear set 14 includes a sun gear member 14C, a ring gear member 14A and a planet gear carrier member 14B that rotatably supports a set of planet gears 14D (only one of which is shown). The sun gear member 14C is connected for common rotation with a first shaft or interconnecting member 42. The ring gear member 14A is connected for common rotation with a second shaft or interconnecting member 44. The planet carrier member 14B is connected for common rotation with the output shaft or member 22. The planet gears 14D are each configured to intermesh with both the sun gear member 14C and the ring gear member 14A.

The planetary gear set 16 includes a sun gear member 16A, a ring gear member 16C and a planet gear carrier member 16B that rotatably supports a set of planet gears 16D (only one of which is shown). The sun gear member 16A is connected for common rotation with the input shaft or member 12. The ring gear member 16C is connected for common rotation with a third shaft or interconnecting member 46. The planet carrier member 16B is connected for common rotation with the second shaft or interconnecting member 44. The planet gears 16D are each configured to intermesh with both the sun gear member 16A and the ring gear member 16C.

The planetary gear set 18 includes a sun gear member 18A, a ring gear member 18C and a planet gear carrier member 18B that rotatably supports a set of planet gears 18D (only one of which is shown). The sun gear member 18A is connected for common rotation with a fourth shaft or interconnecting member 48. The ring gear member 18C is connected for common rotation with the output shaft or member 22. The planet carrier member 18B is connected for common rotation with the third shaft or interconnecting member 46 and a fifth shaft or interconnecting member 52. The planet gears 18D are each configured to intermesh with both the sun gear member 18A and the ring gear member 18C.

The planetary gear set 20 includes a sun gear member 20C, a ring gear member 20A and a planet gear carrier member 20B that rotatably supports a set of planet gears 20D (only one of which is shown). The sun gear member 20C is connected for common rotation with the first shaft or interconnecting member 42. The ring gear member 20A is connected for common rotation with a sixth shaft or interconnecting member 54. The planet carrier member 20B is connected for common rotation with the input shaft or member 12. The planet gears 20D are each configured to intermesh with both the sun gear member 20C and the ring gear member 20A.

The input shaft or member 12 is continuously connected to an engine (not shown) or to a turbine of a torque converter (not shown). The output shaft or member 22 is continuously connected with the final drive unit or transfer case (not shown).

The torque-transmitting mechanisms or clutches 26, 28 and brakes 30, 32, 34 and 36 allow for selective interconnection of the shafts or interconnecting members, members of the planetary gear sets and the housing. For example, the first clutch 26 is selectively engageable to connect the input shaft or member 12 with the fourth shaft or interconnecting member 48. The second clutch 28 is selectively engageable to connect the input shaft or member 12 with the third shaft or interconnecting member 46. The first brake 30 is selectively engageable to connect the fourth shaft or interconnecting member 48 with the stationary element or the transmission housing 50 in order to restrict the member 48 from rotating relative to the transmission housing 50. The second brake 32 is selectively engageable to connect the fifth shaft or interconnecting member 52 with the stationary element or the transmission housing 50 in order to restrict the member 52 from rotating relative to the transmission housing 50. The third brake 34 is selectively engageable to connect the first shaft or interconnecting member 42 with the stationary element or the transmission housing 50 in order to restrict the member 42 from rotating relative to the transmission housing 50. The fourth brake 36 is selectively engageable to connect the sixth shaft or interconnecting member 54 with the stationary element or the transmission housing 50 in order to restrict the member 54 from rotating relative to the transmission housing 50.

Referring now to FIGS. 2 and 3, the operation of the embodiment of the ten speed transmission 10' will be described. It will be appreciated that transmission 10' is capable of transmitting torque from the input shaft or member 12 to the output shaft or member 22 in at ten forward speed torque ratios and at least one reverse speed or torque ratio. Each forward and reverse speed or torque ratio is attained by engagement of one or more of the torque-transmitting mechanisms (i.e. first clutch 26, second clutch 28, first brake 30, second brake 32, third brake 34 and fourth brake 36), as will be explained below. FIG. 3 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque (no "O"'s are shown in FIG. 3). Actual numerical gear ratios of the various gear states are also presented although it should be appreciated that these numerical values are exemplary only and that they may be adjusted over significant ranges to accommodate various applications and operational criteria of the transmission 10'. Of course, other gear ratios are achievable depending on the gear diameter, gear teeth count and gear configuration selected.

For example to establish a reverse gear, first clutch 26 and second brake 32 are engaged or activated. The first clutch 26 connects the input shaft or member 12 with the fourth shaft or interconnecting member 48. The second brake 32 connects the fifth shaft or interconnecting member 52 with the stationary element or the transmission housing 50 in order to restrict the member 52 from rotating relative to the transmission housing 50. Likewise, the ten forward ratios are achieved through different combinations of clutch and brake engagement, as shown in FIG. 3.

It will be appreciated that the foregoing explanation of operation and gear states of the ten speed transmission 10' assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

Referring now to FIG. 4A-4D, a clutch assembly 70 for use with the transmissions 10, 10' is shown. It should be understood, however, that the clutch assembly 70 may be used with any transmission or other device, and it need not be limited to use in the transmissions 10, 10' described herein. In the transmissions 10, 10' described herein, it is contemplated that the clutch assembly 70 is used as the torque transmitting mechanism 32. In other words, the clutch assembly 70 operates as the second brake 32 that selectively couples the third planetary gear carrier member 18B and the second ring gear member 16C with the stationary member 50.

The clutch assembly 70 includes a plurality or group 72 of interleaved clutch plates that are selectively engageable to interconnect a first member 74 with a second member 76. The plurality of interleaved clutch plates 72 includes one or more first clutch plates 78 that are attached to the first member 74; in this case, there are seven first clutch plates 78 that are splined to the first member 74. The plurality of interleaved clutch plates 72 also has one or more second clutch plates 80 that are attached to the second member 76; in this case, there are six second clutch plates 80 splined to the second member 76. In the transmission 10, 10', the first member 74 may be the stationary member 50 and the sixth interconnecting member 52, and the second member 76 may be the other of the stationary member 50 and the sixth interconnecting member 52, by way of example.

The clutch plates 78, 80 may be annular shaped friction plates, having friction material 81 disposed on one or both sides of a core plate, and/or annular shaped separator plates. The first and second clutch plates 78, 80 are arranged alternately with each other. For example, the first clutch plates 78 are interleaved with, and disposed alternatively with, the second clutch plates 80.

When, the clutch assembly 70 is engaged, the piston 82 is operable to compress the plurality of interleaved clutch plates 72 against a backing plate 84. In other words, to engage the clutch assembly 70, a piston head 82 presses the first and second clutch plates 78, 80 against each other and against the backing plate 84, such that one of the clutch plates 78, 80 abuts and contacts the backing plate 84.

Referring to FIGS. 4A-4D, the backing plate 84 has a first piece 86 and a second piece 88. The piston 82 is operable to compress the plurality of interleaved clutch plates 72 against the first piece 86 of the backing plate 84. In the alternative, the backing plate 84 may be formed unitarily as one piece and the plurality of interleaved clutch plates 72 can be compressed against the first part 86 of the backing plate 84.

Both the first piece 86 and the second 88 piece of the backing plate 84 have an annular shape. They may be connected together via splines such as teeth and grooves 90, or by another suitable means. If splines having teeth and grooves 90 are used, they may be intermittently or continuously disposed on each of the first and second pieces 86, 88, and teeth and grooves 90 may be configured to mate with each other to connect the first and second pieces 86, 88 together. In the alternative, the first and second pieces 86, 88 may not be mechanically connected, and they may be held together by other surrounding transmission parts, if desired. The backing plate 84 is disposed adjacent to the plurality of interleaved clutch plates 72.

The first and second pieces 86, 88 cooperate to form an annular passageway 92 therebetween. In other words, an inner side 94 of the first piece 86 and an inner side 96 of the second piece 88 define the annular passageway 92 between them.

Figure 4A:
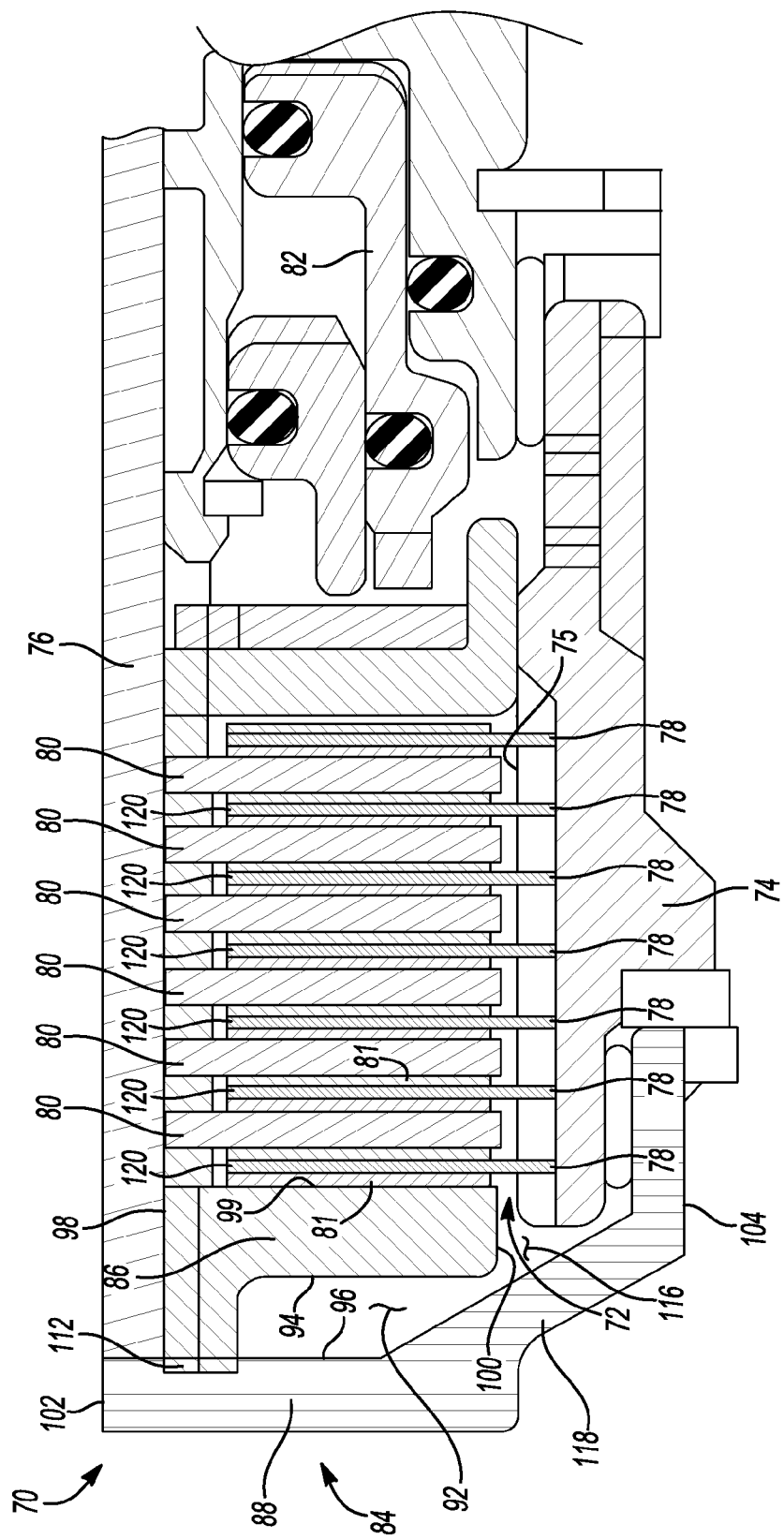
FIG. 4A is a cross-sectional side view of a clutch assembly in accordance with the principles of the present invention.
Figure 4B:
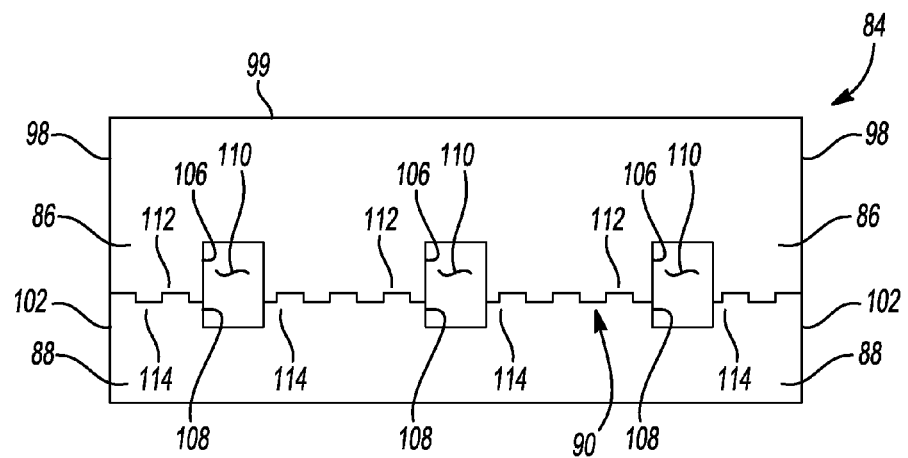
FIG. 4B is a an end view of a backing plate of the clutch assembly of FIG. 4A, according to the principles of the present invention.
Figure 4C:
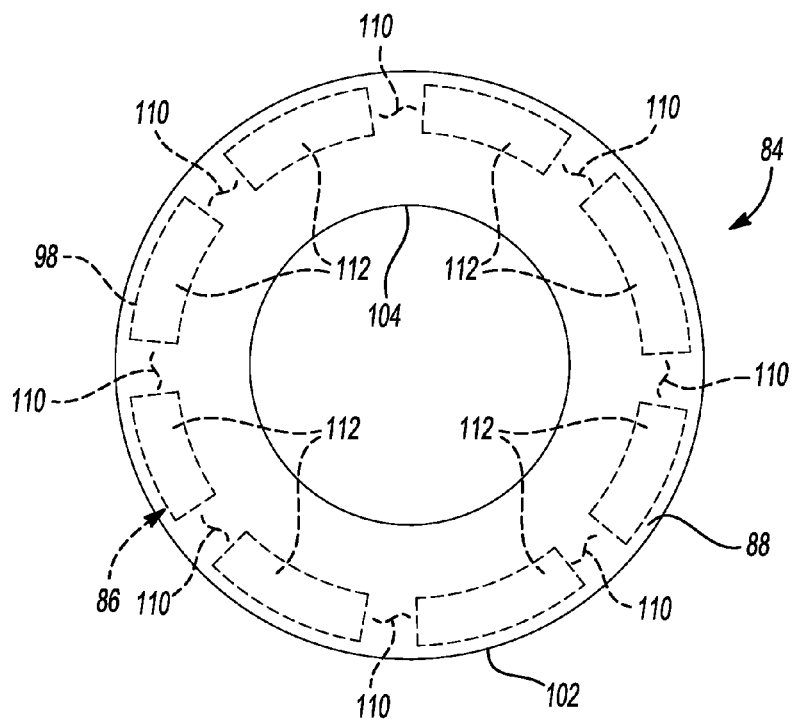
FIG. 4C is a plan view of the backing plate of FIGS. 4A-4B, in accordance with the principles of the present invention.

FIG. 4B illustrates a top view looking down on the orientation of the clutch assembly 70 as illustrated in FIG. 4A. FIG. 4C illustrates an end view of the clutch assembly 70 as viewed from the left side of the clutch assembly 70 in the orientation of FIG. 4A. The first piece 86 has an outer side 98 defining its outer circumference and an inner side 100 defining its inner circumference. Similarly, the second piece 88 has an outer side 102 defining its outer circumference and an inner side 104 defining its inner circumference.

The first piece 86 has a plurality of inlet openings 106 formed in it along a circumference of its outer side 98. The second piece 88 also has a plurality of inlet openings 108 formed in it. In the alternative, only one of the pieces may have inlet openings 106, 108. The inlet openings 106, 108 of the first and second pieces 86, 88 cooperate to form inlet passages 110 to the annular passageway 92. A plurality of legs 112 separate the inlet openings 106 of the first piece 86, another plurality of legs 114 separate the inlet openings 108 of the second piece 88. FIG. 4C illustrates eight inlet passageways 110, but any desired number of inlet passageways 110, for example, two, four, or any other desired number, may be used. In the illustrated example, the inlet passageways are formed in the outer side 98 of the first piece 86, wherein the outer side 98 is disposed at about 90 degrees from the face 99 of the first piece 86 about which the clutch plates 78, 80 are compressed.

In a variation wherein only one of the first and second pieces 86, 88 has inlet openings 106, 108, the adjacent piece 86, 88 may cooperate with the inlet openings 106, 108 of the piece 86, 88 that has openings 106, 108 to form the inlet passages 110. For example, the cooperating piece 86, 88 that does not have inlet openings 106, 108 could have a straight edge that cooperates with the inlet openings 106, 108 of the adjacent piece 86, 88 to form the inlet passageways 110.

Figure 4D:
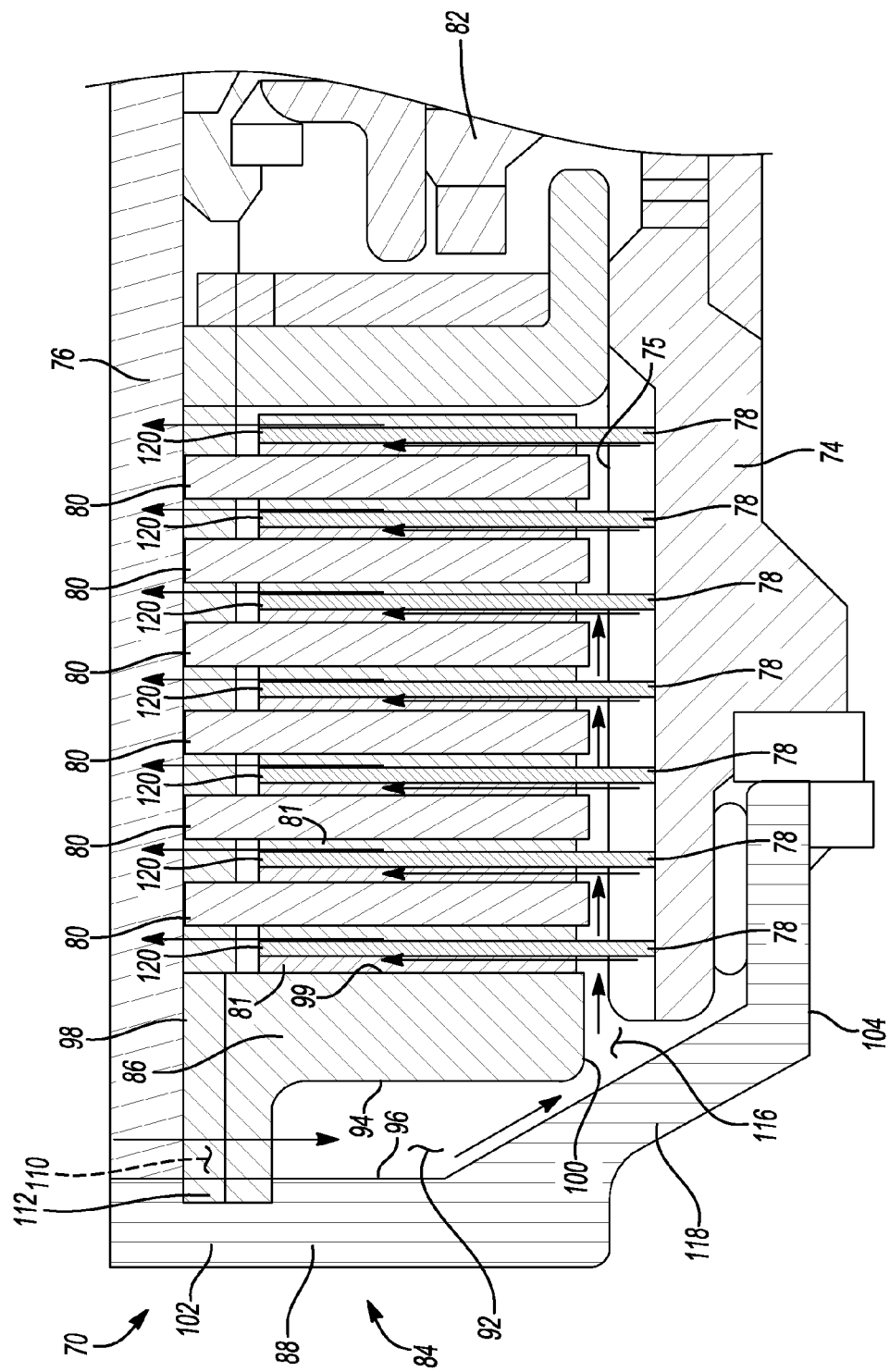
FIG. 4D is a cross-sectional side view of the clutch assembly of FIGS. 4A-4C, schematically illustrating the direction of fluid flow, in accordance with the principles of the present invention.

Referring now to FIGS. 4A and 4D, fluid enters the annular passageway 92 in the backing plate 84 through the inlet openings 106, 108 that form the inlet passageways 110. Before reaching the inlet passageway 110, the fluid could flow from a valve of the valve body to the transmission case 50 and toward the inlet passageway 110, by way of example. The direction of fluid flow is indicated by arrows in FIG. 4D. After entering the inlet passageway 110, the fluid then flows through the annular passageway 92 and out of an annular outlet 116.

The annular outlet 116 is defined by the first and second pieces 86, 88. The annular outlet 116 is by the inner side 100 of the first piece 86 and an outlet portion 118 of the second piece 88. The backing plate 84 is configured to supply fluid to the plurality of interleaved clutch plates 72 through the annular outlet 116. The annular outlet 116 may provide for an even distribution of fluid around a full circumference of the annular outlet 116 of the backing plate 84.

From the annular outlet 116, fluid then flows along the first member 74, which may be a clutch hub, along the inner circumferences of the second set of clutch plates 80. For example, the first member 74 may be a cylindrical clutch hub having an outer side 75, and wherein the backing plate directs fluid along the outer side of the clutch hub. Fluid will then flow between the first and second sets of clutch plates 78, 80. In other words, the fluid flows through the clutch linings, and has a cooling effect on them. Fluid then flows past the outer diameter side 120 of the first clutch plates 78 and enters unrestricted areas in the case, which is the second member 76 in this embodiment. After entering the case splines, fluid flows axially to the sump area of the transmission at the bottom of the case.

The fluid may be a hydraulic, cooling, and/or lubricating fluid. For example, the fluid may be automatic transmission fluid.

The backing plate 84 could be formed in any suitable manner, such as by casting, precision forming, machining, stamping, deep drawing, or from powdered metal, by way of example. It could be formed from any suitable material, such as steel.

The backing plate 84 of the present disclosure provides for cooling of the plurality of interleaved clutch plates 72 via an annular feed of fluid from the annular outlet 116. As such, an adequate amount of fluid is provided to cool the plurality of interleaved clutch plates 72, such that the clutch assembly 70 may be used to launch a vehicle from a stop without the need of a torque converter. In other words, the clutch assembly 70 may be used as a high energy launch clutch, and the backing plate 84 provides for annular cooling thereof. For example, the second brake 32 of the transmissions 10, 10' may be used to launch the vehicle from a stop, and it may incorporate the clutch assembly 70. In the transmissions 10, 10', the second brake 32 may slip until the transmission input speed equals the engine or electric motor speed.

In another variation, the first and second pieces 86, 88 of the backing plate 84 may be formed unitarily as one piece. In such a variation, the plurality of inlet openings 106, 108 could be created in the outer side 98, 100, such as by drilling. The annular passageway 92 could be machined, by removing material from the backing plate 84, by way of example. The rest of the description of the clutch assembly 70 in FIGS. 4A-4D applies to a backing plate 84 that is unitarily formed as a single piece.

The description of the invention is merely exemplary in nature and variations that do not depart from the gist of the invention are intended to be within the scope of the invention. Such variations are not to be regarded as a departure from the spirit and scope of the invention.

What is claimed is:

1. A clutch assembly for use in an automatic transmission, the clutch assembly comprising:
    a plurality of interleaved clutch plates selectively engageable to interconnect a first member with a second member, wherein at least one first clutch plate of the plurality of interleaved clutch plates is attached to the first member and at least one second clutch plate of the plurality of interleaved clutch plates is attached to the second member; and
    a backing plate disposed adjacent to the plurality of interleaved clutch plates, the plurality of interleaved clutch plates being configured to be compressed against the backing plate when the clutch assembly is engaged, the backing plate comprising a first piece and a second piece, the first and second pieces cooperating to form an annular passageway therebetween;
    wherein the first piece of the backing plate has an outer side, the first piece forming a plurality of inlet openings to the annular passageway through the outer side of the first piece, the plurality of inlet openings are formed in the outer side of the first piece along a circumference of the first piece, the first and second pieces each have an annular shape and cooperate to form an annular outlet of the annular passageway, the backing plate is configured to supply fluid to the plurality of interleaved clutch plates through the annular outlet, and the first and second pieces each have a plurality of spline teeth and spline grooves that mate with each other to connect the first and second pieces together.

2. The clutch assembly of claim 1, wherein the plurality of inlet openings are a plurality of first inlet openings, and wherein the second piece forms a plurality of second inlet openings in the second piece along an annular portion of the second piece, the first and second pluralities of inlet openings cooperating to form a plurality of inlet passageways to the annular passageway.

3. The clutch assembly of claim 2, wherein the at least one first clutch plate is a plurality of first clutch plates and the at least one second clutch plate is a plurality of second clutch plates, the clutch assembly further comprising a piston configured to compress the plurality of interleaved clutch plates against the first piece of the backing plate.

4. The clutch assembly of claim 3, wherein the first member is a cylindrical clutch hub having an outer side, and wherein the backing plate directs fluid along the outer side of the clutch hub.

5. A transmission comprising:
    an input member;
    an output member;
    first, second, third and fourth planetary gear sets each having first, second and third members;
    a first interconnecting member continuously interconnecting the first member of the first planetary gear set with the second member of the second planetary gear set;

a second interconnecting member continuously interconnecting the second member of the first planetary gear set with the third member of the third planetary gear set;

a third interconnecting member continuously interconnecting the third member of the first planetary gear set with the third member of the fourth planetary gear set;

a fourth interconnecting member continuously interconnecting the first member of the second planetary gear set with the second member of the fourth planetary gear set;

a fifth interconnecting member continuously interconnecting the third member of the second planetary gear set with the second member of the third planetary gear set; and six torque transmitting mechanisms each selectively engageable to interconnect at least one of the first, second, and third members with at least one other of the first, second, third members and a stationary member, wherein the six torque transmitting mechanisms are selectively engageable in combinations of at least two to establish at least ten forward speed ratios and at least one reverse speed ratio between the input member and the output member, a first torque transmitting mechanism of the six torque transmitting mechanisms comprises a backing plate having a first piece and a second piece, the first and second pieces cooperating to form an annular passageway therebetween, the first torque transmitting mechanism is selectively engageable to interconnect the second member of the third planetary gear set and the third member of the second planetary gear set with the stationary member, the first piece of the backing plate has an outer side, the first piece forming a plurality of inlet openings to the annular passageway through the outer side of the first piece along a circumference of the first piece, the first and second pieces each have an annular shape, and wherein the first and second pieces cooperate to form an annular outlet of the annular passageway, the backing plate being configured to supply fluid to the plurality of interleaved clutch plates through the annular outlet, and the first and second pieces each have a plurality of spline teeth and spline grooves that mate with each other to connect the first and second pieces together.

6. The transmission of claim 5, wherein a second of the six torque transmitting mechanisms is selectively engageable to interconnect the first member of the third planetary gear set with the input member, the first member of the second planetary gear set and the second member of the fourth planetary gear set; wherein a third of the six torque transmitting mechanisms is selectively engageable to interconnect the third member of the second planetary gear set and the second member of the third planetary gear set with the input member, the first member of the second planetary gear set and the second member of the fourth planetary gear set; wherein a fourth of the six torque transmitting mechanisms is selectively engageable to interconnect the first member of the third planetary gear set with the stationary member; wherein a fifth of the six torque transmitting mechanisms is selectively engageable to interconnect the third member of the first planetary gear set and the third member of the fourth planetary gear set with the stationary member; wherein a sixth of the six torque transmitting mechanisms is selectively engageable to interconnect the first member of the fourth planetary gear set with the stationary member; and wherein the output member is continuously connected for common rotation with the second member of the first planetary gear set and the third member of the third planetary gear set.

7. The transmission of claim 6, wherein the third member of the first planetary gear set, the third member of the fourth planetary gear set, the first member of the second planetary gear set, and the first member of the third planetary gear set are sun gear members; wherein the second members of the first, second, third, and fourth planetary gear sets are planetary gear carrier members; and wherein the first member of the first planetary gear set, the first member of the fourth planetary gear set, the third member of the second planetary gear set, and the third member of the third planetary gear set are ring gear members.

8. The transmission of claim 7, wherein the first torque transmitting mechanism further comprises a plurality of interleaved clutch plates selectively engageable to interconnect the stationary member with a sixth interconnecting member that is connected for common rotation with the third planetary gear carrier member and the second ring gear member; wherein a plurality of first clutch plates of the plurality of interleaved clutch plates is attached to the sixth interconnecting member and a plurality of second clutch plates of the plurality of interleaved clutch plates is attached to the stationary member; and wherein the backing plate is disposed adjacent to the plurality of interleaved clutch plates, the first torque transmitting mechanism further comprising a piston member operable to compress the plurality of interleaved clutch plates against the backing plate when the first torque transmitting mechanism is engaged.

9. The transmission of claim 8, wherein the plurality of inlet openings are a plurality of first inlet openings, and wherein the second piece forms a plurality of second inlet openings in the second piece along an annular portion of the second piece, the first and second pluralities of inlet openings cooperating to form a plurality of inlet passageways to the annular passageway.

10. A transmission comprising:
an input member;
an output member;
a first planetary gear set having a first sun gear member, a first planetary gear carrier member, and a first ring gear member;
a second planetary gear set having a second sun gear member, a second planetary gear carrier member, and a second ring gear member;
a third planetary gear set having a third sun gear member, a third planetary gear carrier member, and a third ring gear member;
a fourth planetary gear set having a fourth sun gear member, a fourth planetary gear carrier member, and a fourth ring gear member;
a first interconnecting member continuously interconnecting the first sun gear member with the fourth sun gear member;
a second interconnecting member continuously interconnecting the first planetary gear carrier member with the third ring gear member and the output member;
a third interconnecting member continuously interconnecting the first ring gear member with the second planetary gear carrier member;
a fourth interconnecting member continuously interconnecting the second sun gear member with the fourth planetary gear carrier member and the input member;
a fifth interconnecting member continuously interconnecting the second ring gear member with the third planetary gear carrier member; and
six torque transmitting mechanisms each selectively engageable to interconnect at least one of the sun gear members, the planetary gear carrier members, and the ring gear members with at least one other of the sun gear members, the planetary gear carrier members, the ring gear members and a stationary member, wherein the six torque transmitting mechanisms are selectively engageable in combinations of at least two to establish at least ten forward speed ratios and at least one reverse speed ratio between the input member and the output member;

wherein a first of the six torque transmitting mechanisms is selectively engageable to interconnect the third planetary gear carrier member and the second ring gear member with the stationary member;

wherein a second of the six torque transmitting mechanisms is selectively engageable to interconnect the third sun gear member with the input member, the second sun gear member, and the fourth planetary gear carrier member;

wherein a third of the six torque transmitting mechanisms is selectively engageable to interconnect the second ring gear member and the third planetary gear carrier member with the input member, the second sun gear member, and the fourth planetary gear carrier member;

wherein a fourth of the six torque transmitting mechanisms is selectively engageable to interconnect the third sun gear member with the stationary member;

wherein a fifth of the six torque transmitting mechanisms is selectively engageable to interconnect the first sun gear member and the fourth sun gear member with the stationary member;

wherein a sixth of the six torque transmitting mechanisms is selectively engageable to interconnect the fourth ring gear member with the stationary member; and wherein the first torque transmitting mechanism comprises:
 a plurality of interleaved clutch plates selectively engageable to interconnect the stationary member with a sixth interconnecting member that is continuously connected for common rotation with the third planetary gear carrier member and the second ring gear member, wherein a first set of clutch plates of the plurality of interleaved clutch plates is attached to the sixth interconnecting member and a second set of clutch plates of the plurality of interleaved clutch plates is attached to the stationary member; and a backing plate disposed adjacent to the plurality of interleaved clutch plates, the plurality of interleaved clutch plates being configured to be compressed against the backing plate when the first torque transmitting mechanism is engaged, the backing plate comprising an annular first piece and an annular second piece, the first and second pieces cooperating to form an annular passageway therebetween and an annular outlet of the annular passageway, the first and second pieces each have a plurality of spline teeth and spline grooves that mate with each other to connect the first and second pieces together, the backing plate being configured to supply fluid to the plurality of interleaved clutch plates through the annular outlet, the first piece having an outer side and forming a plurality of inlet openings to the annular passageway through the outer side and along the circumference of the first piece.

11. A clutch assembly for use in an automatic transmission, the clutch assembly comprising:
 a plurality of interleaved clutch plates selectively engageable to interconnect a first member with a second member, wherein at least one first clutch plate of the plurality of interleaved clutch plates is attached to the first member and at least one second clutch plate of the plurality of interleaved clutch plates is attached to the second member; and a backing plate disposed adjacent to the plurality of interleaved clutch plates, the plurality of interleaved clutch plates being configured to be compressed against the backing plate when the clutch assembly is engaged, the backing plate comprising an annular first piece and an annular second piece, the first and second pieces cooperating to form an annular passageway therebetween, the first and second pieces each have a plurality of spline teeth and spline grooves that mate with each other to connect the first and second pieces together, the annular passageway having an annular outlet and a plurality of inlet openings disposed around an outer side of the backing plate along the circumference of the backing plate, the backing plate being configured to supply fluid to the plurality of interleaved clutch plates through the annular outlet.

* * * * *